United States Patent
Ammler

(10) Patent No.: US 10,815,866 B2
(45) Date of Patent: Oct. 27, 2020

(54) METHOD FOR ASCERTAINING BEHAVIOR OF A VALVE INSTALLED IN A VEHICLE, AND VEHICLE

(71) Applicant: AUDI AG, Ingolstadt (DE)

(72) Inventor: Stefan Ammler, Bergheim (DE)

(73) Assignee: AUDI AG, Ingolstadt (DE)

( * ) Notice: Subject to any disclaimer, the term of this patent is extended or adjusted under 35 U.S.C. 154(b) by 217 days.

(21) Appl. No.: 16/081,817

(22) PCT Filed: Feb. 23, 2017

(86) PCT No.: PCT/EP2017/054126
§ 371 (c)(1),
(2) Date: Aug. 31, 2018

(87) PCT Pub. No.: WO2017/148784
PCT Pub. Date: Sep. 8, 2017

(65) Prior Publication Data
US 2019/0093545 A1    Mar. 28, 2019

(30) Foreign Application Priority Data
Mar. 3, 2016   (DE) .................. 10 2016 203 549

(51) Int. Cl.
*F01P 7/14*   (2006.01)
*F01P 11/14*  (2006.01)
(Continued)

(52) U.S. Cl.
CPC ....... *F01P 7/14* (2013.01); *F01P 5/12* (2013.01); *F01P 11/14* (2013.01);
(Continued)

(58) Field of Classification Search
None
See application file for complete search history.

(56) References Cited

U.S. PATENT DOCUMENTS 4,669,426 A * 6/1987 Hirano ............... F01P 11/14
                                          123/198 DB
5,657,722 A * 8/1997 Hollis ............... F01P 7/167
                                          123/41.08
(Continued)

FOREIGN PATENT DOCUMENTS

CN   102292572 A   12/2011
CN   102883907 A    1/2013
(Continued)

OTHER PUBLICATIONS

Office Action dated May 30, 2019, in corresponding Chinese Application No. 201780014248.5; 13 pages.
(Continued)

*Primary Examiner* — Richard M Camby
(74) *Attorney, Agent, or Firm* — Maier & Maier, PLLC

(57) ABSTRACT

A method for ascertaining a control-caused behavior of a valve installed in a vehicle for adjusting a flow of a medium. Operating a pump, which has an electric motor and at least one pump element for conveying the medium, so that the medium is conveyed by the pump in that the pump element is driven by means of the electric motor. Controlling the valve by an electronic computing device of the vehicle. The control of the valve is varied by the electronic computing device. While the medium is conveyed by the pump, and while the control of the valve is varied: sensing at least one parameter characterizing the operation of the pump. Determining the behavior of the valve as a function of the sensed parameter.

6 Claims, 3 Drawing Sheets

(51) Int. Cl.
*F01P 5/12* (2006.01)
*F16D 13/72* (2006.01)
(52) U.S. Cl.
CPC ..... *F01P 2007/146* (2013.01); *F01P 2025/60* (2013.01); *F01P 2031/18* (2013.01); *F01P 2031/20* (2013.01); *F01P 2037/00* (2013.01); *F16D 13/72* (2013.01); *F16D 2300/0214* (2013.01); *F16D 2500/5041* (2013.01)

(56) References Cited

U.S. PATENT DOCUMENTS

| | | | | |
|---|---|---|---|---|
| 5,669,335 | A * | 9/1997 | Hollis | F01P 7/167 |
| | | | | 123/196 AB |
| 7,487,866 | B2 * | 2/2009 | Kruse | F16D 25/123 |
| | | | | 192/113.3 |
| 2001/0020452 | A1 | 9/2001 | Suzuki et al. | |
| 2004/0159520 | A1 * | 8/2004 | Anwar | F16D 25/14 |
| | | | | 192/70.12 |
| 2004/0159523 | A1 * | 8/2004 | Duan | F16D 48/066 |
| | | | | 192/70.12 |
| 2005/0175484 | A1 * | 8/2005 | Yasui | F04D 13/028 |
| | | | | 417/423.6 |
| 2006/0006042 | A1 * | 1/2006 | Koenig | F16D 21/06 |
| | | | | 192/113.3 |
| 2009/0008212 | A1 | 1/2009 | Combes et al. | |
| 2011/0314945 | A1 | 12/2011 | Brandenburg et al. | |
| 2012/0323425 | A1 | 12/2012 | Suyama et al. | |
| 2014/0169994 | A1 | 6/2014 | Schuller et al. | |
| 2014/0318227 | A1 | 10/2014 | Joos et al. | |
| 2016/0047374 | A1 | 2/2016 | Gonze et al. | |
| 2017/0022881 | A1 * | 1/2017 | Matsumoto | F01P 7/16 |
| 2017/0254253 | A1 * | 9/2017 | Hoffmann | F01P 7/14 |

FOREIGN PATENT DOCUMENTS

| | | |
|---|---|---|
| CN | 103419622 A | 12/2013 |
| CN | 103518081 A | 1/2014 |
| CN | 103797233 A | 5/2014 |
| DE | 3402120 A1 | 7/1985 |
| DE | 10105666 A1 | 9/2001 |
| DE | 19820381 B4 | 1/2007 |
| DE | 102006024087 A1 | 11/2007 |
| DE | 102012204492 A1 | 9/2013 |
| DE | 102012019703 A1 | 4/2014 |
| DE | 102013219897 A1 | 4/2015 |
| DE | 102015113199 A1 | 2/2016 |
| WO | 2015/049152 A1 | 4/2015 |
| WO | 2015/155964 A1 | 10/2015 |

OTHER PUBLICATIONS

International Search Report with English translation and Written Opinion dated May 29, 2017 of corresponding International Application No. PCT/EP2017/054126; 17 pgs.

Examination Report dated Jan. 27, 2017 of corresponding German Application No. 10 2016 203 549.5; 6 pgs.

Notification of Transmittal of Translation of the International Preliminary Report on Patentability dated Sep. 13, 2018, in connection with corresponding international Application No. PCT/EP2017/054126 (16 pgs., including English translation).

Office Action dated Apr. 30, 2020 in corresponding European Application No. 17 706 777.4, 6 pages including partial machine-generated English-language translation.

* cited by examiner

METHOD FOR ASCERTAINING BEHAVIOR OF A VALVE INSTALLED IN A VEHICLE, AND VEHICLE

FIELD

The invention relates to a method for ascertaining behavior of a valve installed in a vehicle, as well as to a vehicle.

BACKGROUND

It is known in general from the prior art and, in particular from serial vehicle manufacture, that, in vehicles, such as, for example, motor vehicles, valves are employed, by means of which a respective flow of a medium, such as, for example, a fluid, can be adjusted. Usually, the respective valve is arranged in a particular line and comprises at least one valve element, which can be shifted or moved between at least one first position and at least one second position. In the first position, for example, at least one subregion of a flow cross section of the line through which the medium can flow is fluidically blocked by means of the valve element. In the at least one second position, the valve element releases the subregion, so that the medium can flow all the way through the subregion.

The valve comprises, for example, an electrically operable actuator, by means of which the valve element can be shifted or can be moved. For shifting the valve element, the actuator is controlled, for example, by an electronic computing device of the vehicle, so that a shift or movement of the valve element results from this control. In this case, the movement or shift of the valve resulting from the control is a behavior of the valve resulting from the control. It is thus desirable to have a precise knowledge of the behavior of the valve or the valve element resulting from the control in order to be able to precisely adjust the valve, in particular, the valve element by respective controls, so that, in turn, the flow of the medium can be adjusted precisely. However, it has been shown in this case that the behavior of the valve resulting from the control can vary on account of tolerances, for example.

Furthermore, DE 10 2013 219 897 A1 discloses a method for ascertaining a characteristic value of a coolant circuit of a vehicle. In this case, a coolant pump of the coolant circuit is utilized as a sensor, with the characteristic value of the coolant circulation being determined by an electronic device of the vehicle.

From DE 34 02 120 A1, a method for regulating various operating parameters for pumps and compressors may be taken as known, with the regulation occurring according to characteristic curves of the operating parameters depending on the desired type of operation, and with the measurement of individual operating parameters being made outside of the conveying medium in order to establish the characteristic curves.

Furthermore, DE 101 05 666 A1 discloses a cooling apparatus for a liquid-cooled internal combustion engine.

Known from DE 10 2012 204 492 B4, furthermore, is a method for checking the proper functioning of hydraulic components in a closed cooling circuit of a motor vehicle.

SUMMARY

The object of the present invention is to create a method and a vehicle by means of which an especially precise operation of a valve installed in the vehicle can be realized in an especially simple way for adjusting a flow of a medium.

A first aspect of the invention relates to a method for ascertaining a control-caused behavior of a valve installed in a vehicle for adjusting a flow of a medium, in particular, a fluid. The valve installed in the vehicle is understood to mean that, in the scope of the method, the valve is not situated, for instance, in a test stand differing from the vehicle, but rather that the valve is mounted on the vehicle, that is, is installed in the vehicle and thereby assumes its installed position, with the valve occupying its installed position in the finished manufactured state of the vehicle.

The method comprises a first step, in which a pump, which has an electric motor and at least one pump element, is operated for conveying the medium, so that the medium is conveyed by means of the pump in that the pump element is driven by means of the electric motor. For operating the pump, the electric motor is supplied with electrical current, for example, so that the pump element is driven by means of the electric motor. The medium is thereby conveyed by means of the pump element, for example, to, and in particular, through the valve.

The method comprises a second step, in which the valve is controlled by means of an electronic computing device of the vehicle. In this case, it is preferably provided that the electronic computing device is also installed in the vehicle and thereby occupies its installed position. Accordingly, the electronic computing device, too, is preferably not a computing device of a test stand separate from the vehicle, but rather the electronic computing device, which, for example, may also be referred to as a control unit, is a part or component of the finished manufactured vehicle. For example, the valve is electrically controlled by means of the electronic computing device in that, for example, signals, in particular electrical signals, are transmitted from the electronic computing device to the valve and, in particular, are received by the valve. The control of the valve is thereby varied by means of the electronic computing device. This means that, for instance, a constant control of the valve is not carried out by means of the electronic computing device, but rather the control of the valve changes over time.

The method comprises a third step, in which at least one parameter that characterizes the operation of the pump is sensed while the medium is conveyed by means of the pump and while the control of the valve is varied. The method further comprises a fourth step, in which the control-caused behavior of the valve and, in particular, the behavior caused by the varying control is ascertained as a function of the parameter.

The invention is based, in particular, on the following realization: Usually, it is not possible or it is only possible with great effort to adjust a characteristic curve of a valve for a vehicle. The adjustment or the determination of the characteristic curve of the valve is desirable, however, in order to operate, in particular, in order to control the valve on the basis of the characteristic curve, with the characteristic curve describing, for example, a relationship between a respective control of the valve and a state of the valve resulting from the respective control. In the particular state, for example, at least one element of the valve assumes a particular position.

The precise determination of the characteristic curve of the valve is desirable in order to be able to operate the valve precisely and, in particular, in order to be able to shift or move the valve element precisely, so that undesired volume flows of the medium, which is formed as a fluid, for example, can be prevented. If it is not possible to adjust or determine such a characteristic curve of the valve, then it may be advantageous to determine at least one position of the valve element precisely in that, for example, this position is instructed or taught. However, this is usually possible only by use of a test stand or a test facility in the course of fabrication of the valve, that is, before the installation of the valve in the vehicle, because the test stand comprises corresponding measuring devices, by means of which the position of the valve element or a control-caused behavior of the valve can be ascertained precisely.

If, however, for example, after a respective installation of the valve and of a control unit for controlling the valve in a vehicle, the valve is replaced by a new, different valve on account of a defect, then data acquired by means of the test facility, for example, in regard to the relationship between the control and the behavior of the valve is lost. An adaption of the new, different valve, that is, a determination of the control-caused behavior of the different valve in its state installed in the vehicle is usually not provided. Usually, the valve and, in particular, the data characterizing the behavior thereof can be ascertained only by use of a test stand.

The method according to the invention then makes it possible, however, in an especially simple and cost-effective way, to ascertain especially precisely the corresponding control-caused behavior of the valve installed in the vehicle, so that the valve and, in particular, the valve element thereof can be shifted and, in particular, moved especially precisely for adjusting the flow of the medium so as to be able thereby to influence or adjust, especially precisely, as needed, the flow of the medium. In this case, components in the form of the valve, the pump, and the electronic coupling device, which are installed in the vehicle according to the invention in the scope of the method and are present in any case, are utilized in order to teach the behavior of the valve and, in particular, of at least one position of the valve element. In this case, in the scope of the method according to the invention, it is not necessary to resort to external devices different from the vehicle, but rather the method can be carried out solely by means of the vehicle and accordingly in a simple and cost-effective way. Furthermore, it is possible to dispense with the above-described time-consuming and cost-intensive ascertaining of the behavior of the valve in the course of fabrication of the valve, so that the method according to the invention also makes possible an especially time-saving and cost-effective manufacture of the valve.

Beyond this, it is usually necessary to manufacture the valve especially precisely, in particular in regard to its center position, which can lead to high reject rates in the course of fabrication of the valve. Because, by means of the method according to the invention, it is possible to ascertain the behavior of the valve in its state installed in the vehicle, it is possible to compensate for tolerances of the valve due to fabrication, for example, so that the valve can be manufactured as such in an especially simple and cost-effective way. Excessively high reject rates during fabrication of the valve can thereby be avoided.

It has been found to be especially advantageous when the parameter comprises a power consumption of the electric motor. This is understood to mean that the electric motor is supplied with electrical current in order to drive the pump element by means of the electric motor. The electric motor converts at least a part of the electrical current fed to it into mechanical energy, by means of which the pump element is ultimately driven. This supply of the electric motor with electrical current is also referred to as the power consumption of the electric motor, with at least this power consumption of the electric motor being sensed. It is possible in this way to ascertain the behavior of the valve in an especially simple and cost-effective way.

It has been found to be especially advantageous when, during operation of the pump, the electric motor is operated at a constant rotational speed. The electric motor comprises, for example, a stator and a rotor, which can rotate around an axis of rotation relative to the stator, and which, during operation of the pump, rotates around the axis of rotation at a rotational speed relative to the stator. In this case, it is preferably provided that the rotational speed is at least essentially constant. The pump, which supplies a volume flow of the medium, is operated, for example, in a defined temperature window of the medium at a defined and, in particular, constant rotational speed of the electric motor, and, in particular of the rotor. Accordingly, by means of the pump, for example, the medium is conveyed all the way through the valve. If, for example, the control of the valve is then varied, a through-flow resistance of the medium through the valve is thereby created, which, in turn, leads to a change in the power consumption of the electric motor. In this way, the influence of control of the valve on the flow of the medium can be determined, as a result of which the control-caused behavior of the valve can be ascertained precisely.

It has further been found to be particularly advantageous when the parameter comprises a rotational speed of the electric motor, as a result of which the behavior can be ascertained especially simply and precisely.

Another embodiment is characterized in that, during operation of the pump, the electric motor is operated with a constant electrical current. This embodiment is based on the idea that varying the control of the valve comprises a change in the rotational speed of the electric motor, as a result of which the control-caused behavior of the valve can be ascertained precisely and simply through the rotational speed of the electric motor.

In another advantageous embodiment of the invention, at least one valve element of the valve is moved by the control of the valve. The valve element is arranged, for example, at least in part in a line through which the medium can flow, with the valve element being movable relative to the line. In this way, the valve element is moved by control of the valve. For example, the valve comprises an actuator, in particular an electric actuator, by means of which the valve element can be shifted or moved owing to control of the valve. In other words, for example, the valve element is moved, in particular electrically, by means of the actuator when the valve is controlled. Accordingly, the valve element can be moved into a plurality of different positions by means of the actuator. Accordingly, by varying the control of the valve, the valve element is moved into different positions and this results in the previously described change in the through-flow resistance for the medium brought about by the valve.

For movement of the valve element, the actuator is supplied with electrical current, for example, so that the valve or the actuator is also subject to a default current. In the scope of varying the control, the supply of the valve with electrical current is varied, so that the default current of the valve changes over time. The default current of the valve and, in particular, of the actuator of the valve, is also referred to as the valve current. For example, the valve is controlled by means of a ramp of the valve current, so that the valve current increases constantly, at least substantially, in the scope of varying the control of the valve over time, for example. It is thereby possible in an especially simple and precise way to determine the influence of the control of the valve on the flow of the medium, whereby it is not the change in the flow of the medium itself that is detected, but rather the parameter is detected. Accordingly, via the parameter, a conclusion can be drawn about the influence of the control of the valve on the flow of the medium, so that, once this influence or the behavior of the valve has been ascertained, the flow of the medium can be adjusted by means of the valve especially precisely by corresponding control of the valve.

It has been found to be especially advantageous when, by means of the method, at least one position that lies between two end positions of the valve element, in particular a center position of the valve element, is determined. If the center position is determined, then, starting from the center position, the valve element can be moved especially precisely by corresponding control of the valve in order to be able thereby to adjust the flow of the medium especially precisely.

In another embodiment of the invention, a characteristic curve of the valve is determined by means of the method. The characteristic curve of the valve forms, for example, a relationship between the control of the valve and, in particular, of the valve current and the respective positions of the valve element, with the respective positions of the valve element corresponding to respective flows of the medium. Accordingly, in consequence thereof, the valve can be shifted in position especially precisely on the basis of the characteristic curve of the valve, with it being possible to determine the characteristic curve of the valve in an especially simple and cost-effective way.

Another embodiment is characterized in that, as the valve, a valve for adjusting a flow of an oil to at least one coupling of the vehicle, and, as the pump, a pump for conveying the oil are used. This embodiment is based on the realization that, in the case of such a valve and such a pump, it is usually not possible to transfer the control-caused behavior of the valve. This problem can be solved by means of the method according to the invention in a simple and cost-effective way.

In other words, the valve serves, for example, for adjusting at least one amount of oil to be fed to the coupling, with the coupling being cooled by means of the oil, for example.

A second aspect of the invention relates to a vehicle, in particular a motor vehicle, which is designed for carrying out a method according to the invention. Advantages and advantageous embodiments of the method according to the invention are to be regarded as advantages and advantageous embodiments of the vehicle according to the invention, and vice versa.

Further advantages, features, and details of the invention ensue from the following description of a preferred exemplary embodiment as well as on the basis of the drawing. The features and combinations of features mentioned above in the description as well as the features and combinations of features mentioned below in the description of the figures and/or shown solely in the figures can be used not only in the respectively presented combination, but also in other combinations or alone, without leaving the scope of the invention.

BRIEF DESCRIPTION OF THE DRAWINGS

The drawing shows in.

In the figures, identical or functionally identical elements are furnished with the same reference numbers.

DETAILED DESCRIPTION

Figure 1:
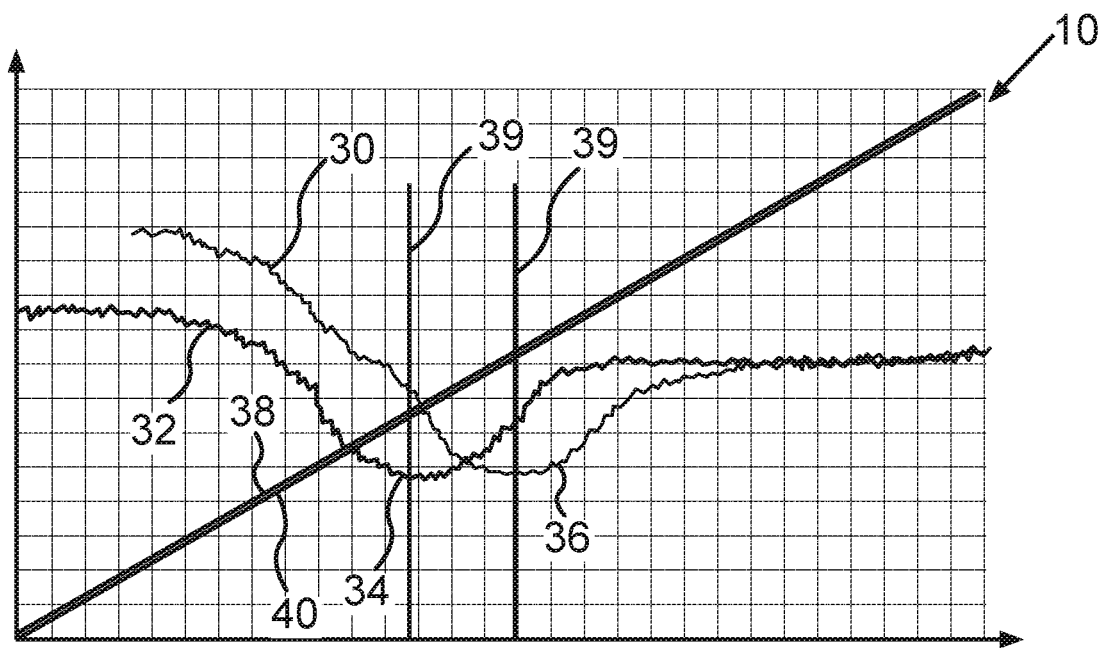
FIG. 1 a diagram for illustrating a first embodiment of a method for ascertaining control-caused behavior of a valve installed in a vehicle.
Figure 3:
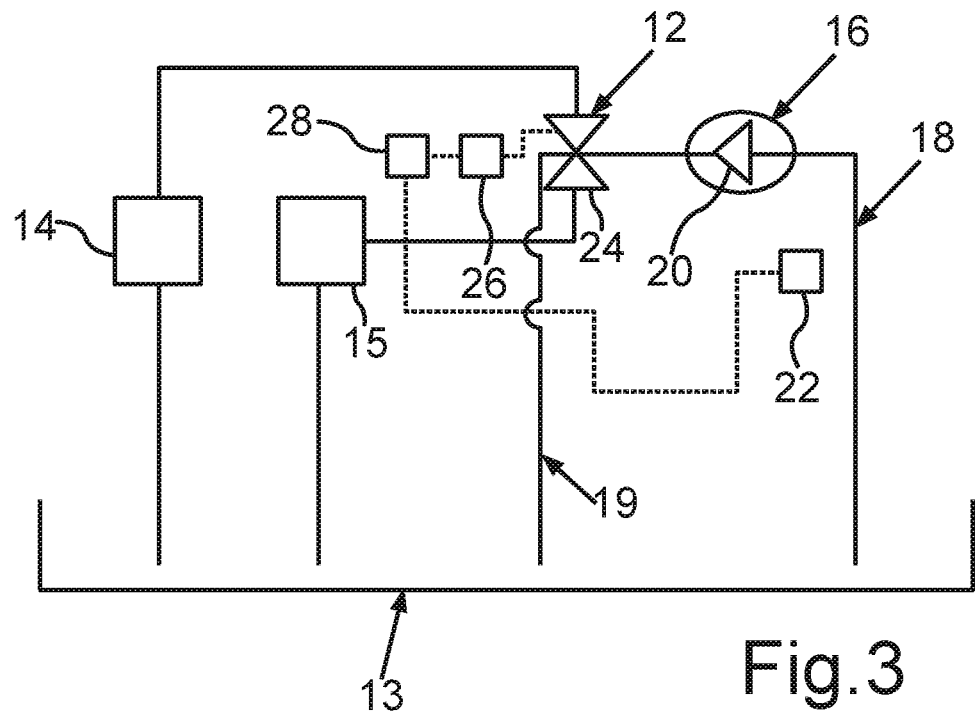
FIG. 3 a schematic illustration of a hydraulic system for a vehicle, with at least one hydraulic circuit in which a valve is arranged.

FIG. 1 shows a diagram 10 for illustrating a first embodiment of a method for ascertaining control-caused behavior of a valve 12, which is installed in a vehicle and is schematically illustrated in FIG. 3, for adjusting a flow of a medium in the form of a fluid.

The valve 12 is utilized, for example, in a hydraulic system of the vehicle illustrated schematically in FIG. 3. The hydraulic system has at least one hydraulic circuit through which the medium can flow, with the medium being an oil. The hydraulic system further comprises at least one pump 16, which is arranged in the hydraulic circuit 18, for conveying the oil. From a sump 13, the oil is conveyed by means of the pump 16 through the hydraulic circuit 18 and thereby conveyed to the valve 12. In this case, the pump 16 comprises at least one pump element 20 and an electric motor 22, by means of which the pump element 20 can be driven or is driven. Through driving of the pump element 20, the oil is conveyed by means of the pump element 20 through the hydraulic circuit.

In order to drive the pump element 20 by means of the electric motor 22, the electric motor 22 is supplied with electrical current, so that the electric motor 22 has a current consumption or a power consumption.

The valve 12 is constructed as a shiftable or adjustable valve and comprises at least one valve element 24, which, for example, is arranged at least in part in at least one line of the hydraulic circuit 18. The valve element 24 can be shifted, that is, moved, for example, between at least two positions.

Figure 4:
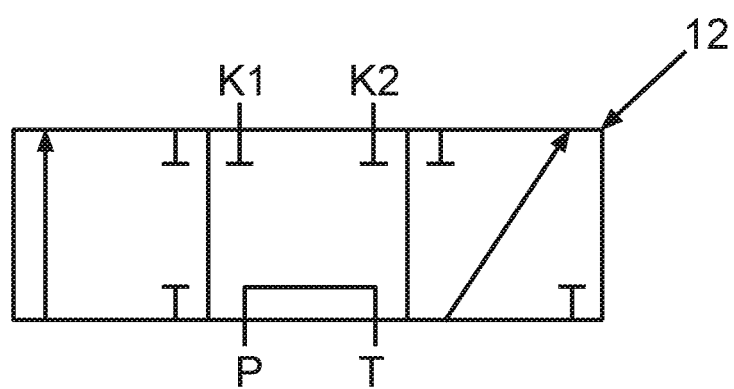
FIG. 4 a schematic illustration of the valve.

It can be recognized from FIG. 4 that, in the present case, the valve 12 is constructed as a 4/3-way valve and, in this case, has three shift positions and four connections P, T, K1, and K2. The three shift positions are understood to mean that the valve element 24 can be moved into three different positions. For movement of the valve element 24, the valve 12 comprises an actuator 26, which, for example, can be operated as an electric actuator and accordingly is electrically operable. For example, what is involved in the case of the actuator 26 is an electromagnet or an electric motor. For movement of the valve element 24, the actuator 26 is supplied with electrical current, with this electrical current with which the actuator 26 or the valve 12 is supplied also being referred to as the valve current.

Also arranged in the hydraulic circuit 18 are two couplings 14 and 15 of the vehicle. Moreover, the hydraulic circuit 18 has a line 19, via which the oil can bypass the couplings 14 and 15. This is understood to mean that the oil flowing through the line 19 bypasses the couplings 14 and 15 and accordingly does not flow to or through the couplings 14 and 15. The oil is used, for example, to cool the respective couplings 14 and 15, which are designed, for example, as friction couplings of the vehicle.

The vehicle is, for example, a motor vehicle, which comprises a drive motor, such as, for example, an internal combustion engine. The drive motor comprises, for example, a driven shaft, by way of which the drive motor can supply torques for driving the motor vehicle. At least one of the couplings 14 and 15 can be shifted, for example, between a closed or engaged state and an opened or disengaged state. In the closed state, the driven shaft is coupled via the respective coupling 14 or 15, for example, to another shaft of the vehicle, so that torques can be transmitted between the driven shaft and the other shaft. In the opened state, the other shaft, for example, is decoupled from the driven shaft, so that no torques can be transmitted between the driven shaft and the other shaft via the coupling 14 or 15.

In this case, the vehicle comprises the hydraulic system and accordingly the hydraulic circuit 18, the pump 16, the pump element 20, the electric motor 22, the valve 12, the valve element 24, and the actuator 26, as well as the couplings 14 and 15, so that the hydraulic system is installed as a component of the completely manufactured vehicle and accordingly is installed in the vehicle. The vehicle further comprises an electronic computing device 28, which is also referred to as a control unit. The control unit can control the valve 12 and, in particular, the actuator 26. In particular, the control unit (electronic computing device 28) can electrically control the actuator 26 in that, for example, electrical signals are transmitted from the electronic computing device 28 to the actuator 26 and received by the actuator 26. Through the control of the valve 12 brought about by means of the electronic computing device 28, the valve current is adjusted, for example. Through varying the control of the valve 12, for example, the valve current is varied, as a result of which the valve element 24, for example, can be moved into different positions, that is, into the different shift positions in order to thereby adjust, for example, different flows or volume flows of the oil.

This means that the control of the valve 12 results in a movement or a position of the valve element 24. In this case, it is desirable to know precisely the respective position of the valve element 24 resulting from the respective, corresponding control of the valve 12 in order to adjust precisely the flow of the oil. The respective movement or position of the valve element 24 resulting from the respective control of the valve 12 is referred to as the control-caused behavior of the valve 12, because the valve 12 and, in particular, the valve element 24 behave or move corresponding to the control.

Depending on the position of the valve 12 and, in particular, of the valve element 24, and, accordingly, depending on the control of the valve 12 and, in particular, of the actuator 26, the oil coming from the pump 16 via the coupling 14 and/or via the coupling 15 and/or via the line 19 is returned to a sump 13 accommodated in a tank, for example. In other words, the valve 12 is utilized in order to adjust, for example, a first amount of oil flowing to the coupling 14, a second amount of oil flowing to the coupling 15, and a third amount of oil flowing through the line 19.

Figure 5:
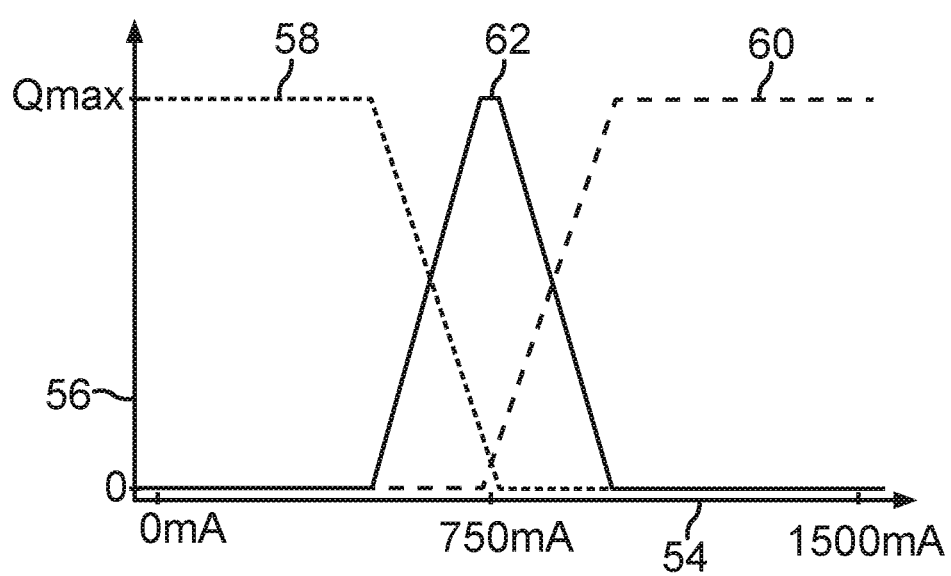
FIG. 5 a characteristic curve of the valve.

Here, FIG. 5 shows a characteristic curve of the valve 12, with this characteristic curve applying nominally for the valve 12. Plotted on the abscissa 54 is the valve current in the unit milliamperes (mA) and plotted on the ordinate 56 is the volume flow of the oil, in particular through the valve 12. Qmax is the maximum volume flow of the oil. At 0, no oil flows. In FIG. 5, a curve 58 depicts the volume flow of the oil to the coupling 14. Furthermore, a curve 60 depicts the volume flow of the oil to the coupling 15 and a curve 62 depicts the volume flow of the oil to or through the line 19.

A first of the positions of the valve element 24, for example, is a first end position, while a second of the positions is a second end position of the valve element 24. The third position is, for example, a centered position of the valve element 24 lying between the end positions and, in particular, exactly in the middle between the end positions, with the centered position also being referred to as the center position.

At nominally 750 milliamperes, the valve 12 or the valve element 24 occupies its center position. In this case, this center position is the position of the valve 12 or of the valve element 24 in which the oil or the volume flow thereof is carried exclusively via the line 19—not, however, via the couplings 14 and 15—to the sump 13, so that neither the coupling 14 nor the coupling 15 is exposed to or supplied with oil.

The valve element 24 occupies the first position at nominally 0 milliampere. At nominally 1500 milliamperes, the valve element 24 occupies the second end position. Accordingly, the first end position is a position for exclusive exposure of the first coupling 14, while the second position is a position for exclusive exposure of the second coupling 15.

FIG. 1 depicts a first embodiment of a method, by means of which the behavior of the valve 12 caused by control of the valve 12 can be ascertained especially precisely and simply and cost-effectively. In a first step of the method, the pump 16 is operated, so that, by means of the pump 16, the oil is conveyed in that the pump element 20 is driven by means of the electric motor 22. In a second step of the method, the valve 12 is controlled by means of the electronic computing device 28, with the control of the valve 12 being varied by means of the electronic computing device 28. In a third step of the method, at least one parameter characterizing the operation of the pump 16 is sensed, with the fluid (oil) being conveyed by means of the pump 16 to and, in particular, through the valve 12 and being varied during the control of the valve 12.

Furthermore, in a fourth step of the method, the behavior of the valve 12 is ascertained as a function of the sensed parameter. In the first embodiment, it is provided that the parameter comprises at least the power consumption of the electric motor 22. Plotted in the diagram 10 are curves 30 and 32, which depict the power consumption of the electric motor 22 over time. This power consumption of the electric motor 22 is also referred to as the motor current. It can be seen from FIG. 1 that the curves have respective minima 34 and 36. Further plotted in the diagram 10 are curves or lines 38 and 40, which each depict the valve current and accordingly the control, that is, the varying control.

In the scope of varying the control, the valve 12 and, in particular, the actuator 26, are controlled by means of a rising ramp, depicted by the line 38, and/or by means of a falling ramp, depicted by the line 40, of the valve current. Furthermore, in the first embodiment, it is provided that, during the operation of the pump 16, the electric motor 22 is operated at a constant rotational speed. In this case, it is provided, in particular, that the electric motor 22 is operated in a defined temperature window of the oil at a defined and constant rotational speed. If the valve current is then adjusted in the form of a rising ramp (line 38) and/or of a falling ramp (line 40), the position of the valve element 24 changes and, accordingly, a through-flow resistance for the oil flowing through the valve 12 is created by the valve 12 and, in particular, by the valve element 24, so that the through-flow resistance is changed, in particular as a function of the valve current.

This leads, in turn, to a change in the power consumption of the electric motor 22, which can be seen on the basis of the curves 30 and 32. The curve 30 indicates, for example, the motor current for rising valve current (curve 40), while the curve 32 indicates, for example, the motor current for falling valve current (curve 38). For example, in the respective region of the end positions, also referred to as the limit positions, and of the center position of the valve element 24, the through-flow resistance is smallest, so that, in these regions, the lowest power consumption of the electric motor 22 is adjusted. Accordingly, this lowest power consumption occurs at the positions of the minima 34 and 36 and is indicated in FIG. 1 by the vertical lines 39.

The power consumption of the electric motor 22, that is, the respective curve 30 or 32 and, in particular, the respective minima 34 or 36, and accordingly the center position, can be identified by a minimum value analysis of the respective curve 30 or 32. Accordingly, the associated valve current represents the center position of the valve element 24. In other words, the valve current belonging to the respective minimum 34 or 36 results in the center position of the valve element 24. If, for example, the method is carried out repeatedly with a rising and falling ramp of the valve current, then any hysteresis of the center position and the scatter thereof are determined and are stored in a memory device, such as, for example, an EEPROM of the control unit (electronic computing device 28), which is designed, for example, as a gearbox control unit. The method can be carried out both directly after manufacture of the vehicle in its new condition and also during repair of the vehicle, so that it is not necessary to resort to separate test devices.

Figure 2:
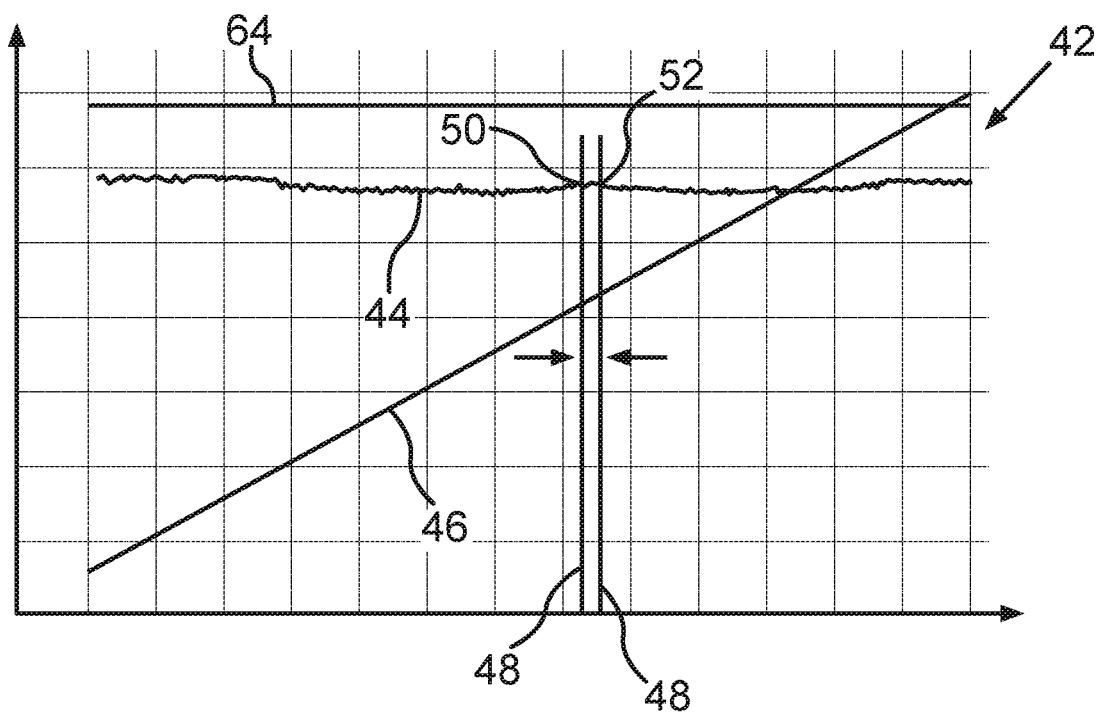
FIG. 2 another diagram for illustrating a second embodiment of the method.

FIG. 2 shows a diagram 42, by means of which a second embodiment of the method is illustrated. In the second embodiment, the parameter comprises a rotational speed of the electric motor, with the electric motor being operated with a constant electrical current during operation of the pump 16. Plotted in the diagram is a curve or line 64, which depicts the motor current, on the basis of which it can be seen that the motor current is constant, at least substantially.

Further plotted in the diagram 42 is a curve 44, which depicts the rotational speed of the electric motor 22 over time. Moreover, plotted in the diagram 42 is a curve or line 46, which depicts the valve current and accordingly the varying control of the valve 12. In the second embodiment, the electric motor 22 is operated, for example, in a defined temperature window of the oil at its maximum rotational speed, with this maximum speed being limited, on the one hand, by the maximum allowed motor current and, on the other hand, by the through-flow resistance for the oil.

If the electric motor 22 is then operated with the maximum allowed motor current and the valve current is varied, in particular in the form of a rising or falling ramp, the through-flow resistance changes as a function of the valve current and this leads, in turn, to a change in the rotational speed of the electric motor 22. This change in the rotational speed of the electric motor 22 can be determined on the basis of the curve 44. In the present example, the through-flow resistance for the oil brought about by the valve 12 is lowest in the region of the center position of the valve 12 and, in particular, of the valve element 24, as a result of which it is possible to adjust the highest rotational speeds there. This is indicated in FIG. 2 by vertical lines 48, which—like the vertical lines 39 in FIG. 1—limit or indicate the hysteresis of the center position of the valve element 24.

The curve 44 has, for example, a maximum 50 for a falling valve current and a maximum 52 for a rising valve current, with the lines 48 passing through the maxima 50 and 52. Accordingly, the respective maximum 50 or 52 is an excessive rotational speed in the region of the center position, with this excessive speed being identified by a maximum value analysis of the curve 44. The associated valve current represents the center position of the valve 12 and, in particular, of the valve element 24. If the method is carried out repeatedly with a rising and falling ramp of the valve current, then any hysteresis of the center position and the scatter thereof can be determined and stored in the memory device of the electronic computing device 28. The second embodiment of the method can also be carried out during a repair.

The invention claimed is:

1. A method for ascertaining a control-caused behavior of a valve installed in a vehicle for adjusting a flow of a medium, comprising:
   operating a pump, which has an electric motor and at least one pump element for conveying the medium, wherein the medium is conveyed by the pump and the pump element is driven by the electric motor;
   controlling a position of the valve by an electronic computing device of the vehicle, wherein the valve is varied by the electronic computing device between a first end position in which the medium exclusively flows to a first coupling, a second end position in which the medium exclusively flows to a second coupling, and a third position centered between the first end position and the second end position in which the medium bypasses the first coupling and the second coupling;
   sensing at least one parameter during the operation of the pump while the medium is conveyed and while the valve is varied; and
   determining the position of the valve as a function of the sensed parameter.

2. The method according to claim 1, wherein the parameter comprises a power consumption of the electric motor.

3. The method according to claim 2, wherein, during the operation of the pump, the electric motor is operated at a constant rotational speed.

4. The method according to claim 1, wherein the parameter comprises a rotational speed of the electric motor.

5. The method according to claim 4, wherein, during the operation of the pump, the electric motor is operated with a constant electrical current.

6. The method according to claim 1, wherein a characteristic curve of the valve is determined.

* * * * *